US012743340B2

(12) United States Patent
Kuo et al.

(10) Patent No.: US 12,743,340 B2
(45) Date of Patent: Sep. 22, 2026

(54) OPERATING SYSTEM RESTORATION METHOD AND SYSTEM USING THE SAME

(71) Applicant: Acer Incorporated, New Taipei City (TW)

(72) Inventors: Ming-Hao Kuo, New Taipei City (TW); Hung-Ming Chang, New Taipei City (TW); Hong-Jiun Wu, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 0 days.

(21) Appl. No.: 19/174,872

(22) Filed: Apr. 9, 2025

(65) Prior Publication Data

US 2026/0252446 A1 Aug. 27, 2026

(30) Foreign Application Priority Data

Feb. 24, 2025 (TW) ................................ 114106659

(51) Int. Cl.

| | |
|---|---|
| ***G06F 8/60*** | (2018.01) |
| ***G06F 8/65*** | (2018.01) |
| ***G06F 8/70*** | (2018.01) |
| ***G06F 11/14*** | (2006.01) |
| *G06F 21/57* | (2013.01) |

(52) U.S. Cl.

CPC ............ *G06F 11/1415* (2013.01); *G06F 8/60* (2013.01); *G06F 8/65* (2013.01); *G06F 8/70* (2013.01); *G06F 11/1402* (2013.01); *G06F 11/1433* (2013.01); *G06F 21/57* (2013.01); *G06F 2201/84* (2013.01)

(58) Field of Classification Search

CPC ........... G06F 11/1402; G06F 8/60; G06F 8/65

See application file for complete search history.

(56) References Cited

U.S. PATENT DOCUMENTS

| | | | | |
|---|---|---|---|---|
| 9,218,253 | B2 * | 12/2015 | DiMarzio, Jr. ..... | G06F 11/1469 |
| 9,424,056 | B1 * | 8/2016 | Bachu ................ | G06F 9/45558 |
| 9,529,806 | B1 * | 12/2016 | Sumant .............. | G06F 11/1469 |

(Continued)

FOREIGN PATENT DOCUMENTS

| | | |
|---|---|---|
| CN | 114547584 | 5/2022 |
| CN | 116204363 | 6/2023 |

(Continued)

*Primary Examiner* — Jonathan D Gibson

(74) *Attorney, Agent, or Firm* — JCIPRNET

(57) ABSTRACT

An operating system restoration method and a system using the same are disclosed. The method includes: establishing a connection between an external device and an electronic device; based on the connection, obtaining, by an agent program in the external device, first verification information from the electronic device; uploading, by the agent program, the first verification information to a server; after the first verification information passes verification of the server, downloading, by the agent program, an operating system restoration file from the server to the electronic device; based on the operating system restoration file, performing, by the agent program, an operating system restoration operation on the electronic device; and after the operating system restoration operation is completed, removing, by the agent program, the operating system restoration file from the electronic device.

16 Claims, 3 Drawing Sheets

(56) References Cited

U.S. PATENT DOCUMENTS

| | | | | |
|---|---|---|---|---|
| 10,394,657 | B2 * | 8/2019 | Gostev | G06F 11/1448 |
| 12,204,931 | B1 * | 1/2025 | Averin | G06F 11/0778 |
| 2006/0059327 | A1 * | 3/2006 | Brown | G06F 9/44505 713/1 |
| 2008/0005611 | A1 * | 1/2008 | Solyanik | G06F 11/1451 714/E11.122 |
| 2011/0016093 | A1 * | 1/2011 | Clark | G06F 11/1453 711/E12.001 |
| 2011/0258486 | A1 * | 10/2011 | Bhogal | G06F 11/1441 714/15 |
| 2014/0325273 | A1 * | 10/2014 | Streuter | G06F 8/65 714/20 |
| 2016/0055064 | A1 * | 2/2016 | Gostev | G06F 11/1448 726/4 |
| 2016/0364144 | A1 * | 12/2016 | Lyadvinsky | G06F 11/00 |
| 2017/0322790 | A1 * | 11/2017 | Surdu | G06F 11/1433 |
| 2018/0136940 | A1 * | 5/2018 | Mallichan | G06F 8/61 |
| 2019/0391742 | A1 | 12/2019 | Bhagi et al. | |
| 2020/0057567 | A1 | 2/2020 | Hutcheson et al. | |
| 2022/0179756 | A1 * | 6/2022 | Fan | G06F 11/1469 |
| 2022/0326944 | A1 * | 10/2022 | Khan | G06N 20/00 |
| 2023/0342132 | A1 * | 10/2023 | O'Dell | G06F 8/62 |
| 2025/0200186 | A1 * | 6/2025 | KB | G06F 21/575 |

FOREIGN PATENT DOCUMENTS

| | | |
|---|---|---|
| TW | 201227513 | 7/2012 |
| TW | I716969 | 1/2021 |

* cited by examiner

OPERATING SYSTEM RESTORATION METHOD AND SYSTEM USING THE SAME

CROSS-REFERENCE TO RELATED APPLICATION

This application claims the priority benefit of Taiwan application no. 114106659, filed on Feb. 24, 2025. The entirety of the above-mentioned patent application is hereby incorporated by reference herein and made a part of this specification.

BACKGROUND

Technical Field

The disclosure relates to an operating system restoration method and system using the same.

Description of Related Art

Traditionally, whether before electronic device shipment or after delivery to the client, when an electronic device needs to undergo operating system restoration, the operator needs to manually download the operating system restoration file from the manufacturer's website according to the electronic device model, and then perform operating system restoration on the electronic device based on this operating system restoration file. However, a common problem in practice is that when the operator downloads an incorrect operating system restoration file and attempts to perform operating system restoration on the electronic device based on this operating system restoration file, the electronic device may experience restoration failure. Furthermore, even if the operating system restoration is successfully performed on the electronic device based on the incorrect operating system restoration file, the electronic device may subsequently experience various technical issues such as inability to boot, inability to shut down, crashes during operation, and/or lack of drivers.

SUMMARY

The disclosure provides an operating system restoration method and system using the same, which may improve the above-mentioned problems.

An embodiment of the disclosure provides an operating system restoration method, including: establishing a connection between an external device and an electronic device; based on the connection, obtaining, by an agent program in the external device, first verification information from the electronic device; uploading, by the agent program, the first verification information to a server; after the first verification information passes verification of the server, downloading, by the agent program, an operating system restoration file from the server to the electronic device; based on the operating system restoration file, performing, by the agent program, an operating system restoration operation on the electronic device; and after the operating system restoration operation is completed, removing, by the agent program, the operating system restoration file from the electronic device.

An embodiment of the disclosure further provides an operating system restoration system, including an electronic device and an external device. The external device is configured to: establish a connection between the external device and the electronic device; based on the connection, obtain, by an agent program in the external device, first verification information from the electronic device; upload, by the agent program, the first verification information to a server; after the first verification information passes verification of the server, download, by the agent program, an operating system restoration file from the server to the electronic device; based on the operating system restoration file, perform, by the agent program, an operating system restoration operation on the electronic device; and after the operating system restoration operation is completed, remove, by the agent program, the operating system restoration file from the Based on the above, after establishing a connection between the external device and the electronic device, the agent program in the external device may obtain first verification information from the electronic device based on the connection and upload the first verification information to the server. After the first verification information passes verification of the server, the agent program may download an operating system restoration file from the server to the electronic device, and perform an operating system restoration operation on the electronic device based on the operating system restoration file. After the operating system restoration operation is completed, the agent program may also automatically remove the operating system restoration file from the electronic device. Therefore, the operating system restoration method and system using the same of the disclosure not only avoid restoration failures caused by performing operating system restoration on electronic devices based on incorrect operating system restoration files as in traditional methods, but also effectively ensure the reliability and security of the electronic device after performing operating system restoration.

DESCRIPTION OF THE EMBODIMENTS

Figure 1:
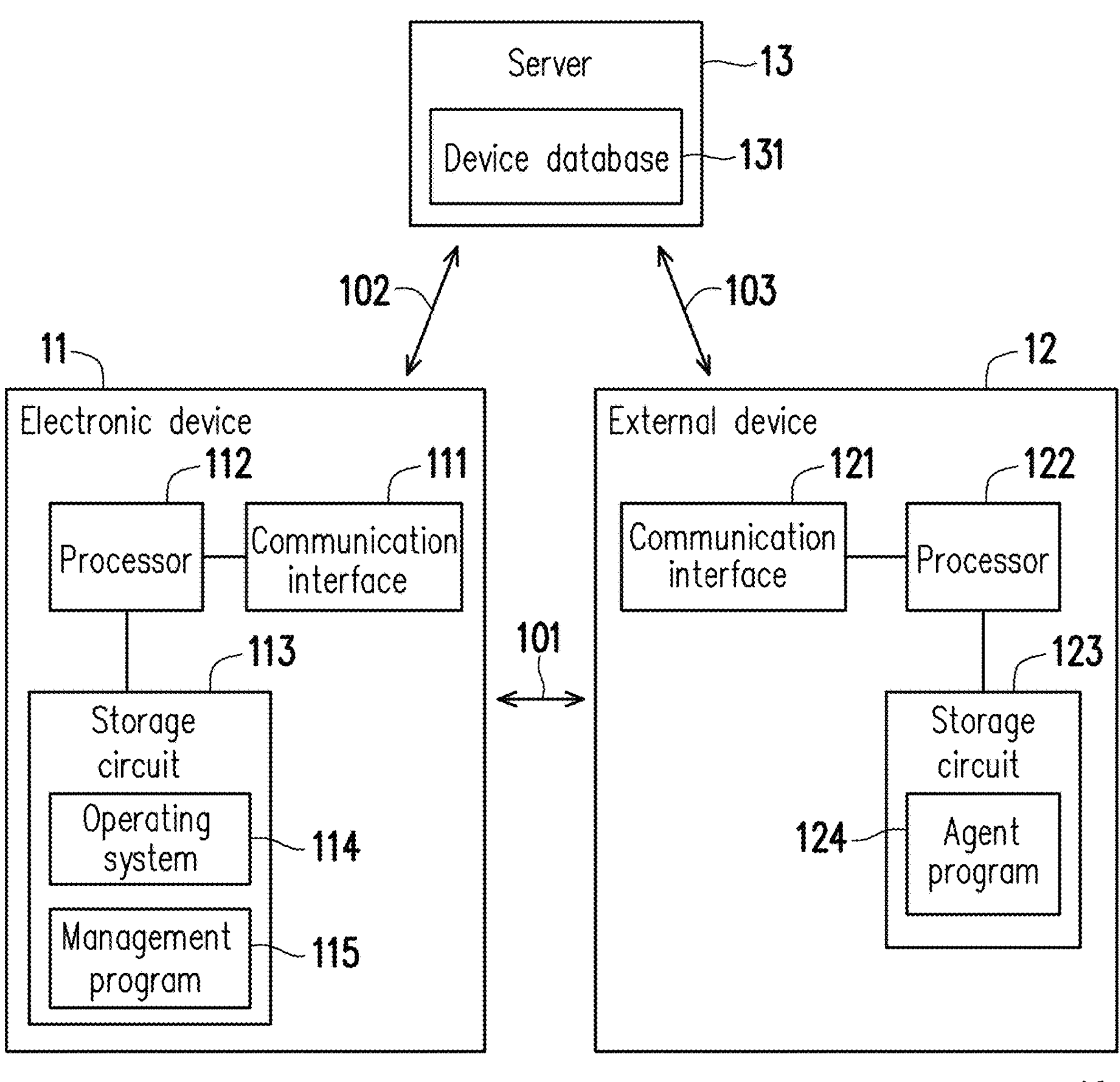
FIG. 1 is a schematic diagram of an operating system restoration system according to an embodiment of the disclosure.

FIG. 1 is a schematic diagram of an operating system restoration system according to an embodiment of the disclosure. Referring to FIG. 1, a system (also referred to as an operating system restoration system) 10 includes an electronic device 11, an external device 12, and a server 13. The electronic device 11 may include a smartphone, a tablet computer, a laptop computer, a desktop computer, an industrial computer, a game console, a server host, or a computer host installed in a specific carrier (for example, a vehicle, an aircraft, or a ship), and the type of the electronic device 11 is not limited thereto. The external device 12 may include one of a portable computer device and a portable storage device. For example, the external device 12 may include various portable computer devices such as a smartphone, a tablet computer, or a laptop computer. Alternatively, the external device 12 may include various portable storage devices such as a USB flash drive or a portable hard drive. In addition, the server 13 may include at least one server host.

In an embodiment, the electronic device 11 and the external device 12 may communicate (for example, exchange signals) via a connection 101. For example, the connection 101 may include one of a wired connection and a wireless connection.

In an embodiment, the electronic device 11 and the server 13 may communicate (for example, exchange signals) through a connection 102. For example, the connection 102 may include one of a wired connection and a wireless connection.

In an embodiment, the external device 12 and the server 13 may communicate (for example, exchange signals) through a connection 103. For example, the connection 103 may include one of a wired connection and a wireless connection.

In an embodiment, the connection 102 may not exist. In an embodiment, the connection 103 may not exist. In an embodiment, one of the connections 102 and 103 may exist.

The electronic device 11 may include a communication interface 111, a processor 112, and a storage circuit 113. The communication interface 111 is configured to execute wired and/or wireless communication functions. For example, the communication interface 111 may include at least one communication circuit. The electronic device 11 may communicate with the external device 12 and/or the server 13 via the communication interface 111. For example, the communication interface 111 may support wireless communication protocols such as WIFI, Bluetooth, Bluetooth Low Energy (BLE), or Long Term Evolution (LTE), and/or wired communication protocols such as Ethernet. The disclosure does not limit the quantity and type of the communication interface 111.

The processor 112 is coupled to the communication interface 111 and the storage circuit 113. The processor 112 is configured to be responsible for the overall or partial operation of the electronic device 11. For example, the processor 112 may include a central processing unit (CPU), a graphic processing unit (GPU) or other programmable general purpose or special purpose microprocessors, a digital signal processor (DSP), a programmable controller, an application specific integrated circuit (ASIC), a programmable logic device (PLD), or other similar devices, or a combination thereof. The disclosure does not limit the quantity and type of the processor 112.

The storage circuit 113 is configured to save data. For example, the storage device 113 may include a volatile storage circuit and a non-volatile storage circuit. The volatile storage circuit is configured to volatilely save data. For example, the volatile storage circuit may include a random access memory (RAM) or similar volatile storage media. The non-volatile storage circuit is configured to non-volatilely save data. For example, the non-volatile storage circuit may include a read only memory (ROM), a solid state disk (SSD), a traditional hard disk drive (HDD), or similar non-volatile storage media. The disclosure does not limit the quantity and type of the storage device 113.

In an embodiment, an operating system 114 is stored in the storage circuit 113. The processor 112 may operate the operating system 114 to facilitate user operation of the electronic device 11. For example, the operating system 114 may include iOS, Microsoft operating system (Windows), or other types of operating systems. The disclosure does not limit the quantity and type of the operating system 114.

The external device 12 includes a communication interface 121, a processor 122, and a storage circuit 123. The communication interface 121 is configured to execute wired and/or wireless communication functions. For example, the communication interface 121 may include at least one communication circuit. The external device 12 may communicate with the electronic device 11 and/or the server 13 via the communication interface 121. For example, the communication interface 121 may support wireless communication protocols such as WIFI, Bluetooth, Bluetooth Low Energy (BLE), or Long Term Evolution (LTE), and/or wired communication protocols such as Ethernet. The disclosure does not limit the quantity and type of the communication interface 121.

The processor 122 is coupled to the communication interface 121 and the storage circuit 123. The processor 122 is configured to be responsible for the overall or partial operation of the external device 12. For example, the processor 122 may include a central processing unit (CPU), a graphic processing unit (GPU) or other programmable general purpose or special purpose microprocessors, a digital signal processor (DSP), a programmable controller, an application specific integrated circuit (ASIC), a programmable logic device (PLD), or other similar devices, or a combination thereof. The disclosure does not limit the quantity and type of the processor 122.

The storage circuit 123 is configured to save data. For example, the storage device 123 may include a volatile storage circuit and a non-volatile storage circuit. The volatile storage circuit is configured to volatilely save data. For example, the volatile storage circuit may include a random access memory (RAM) or similar volatile storage media. The non-volatile storage circuit is configured to non-volatilely save data. For example, the non-volatile storage circuit may include a read only memory (ROM), a solid state disk (SSD), a traditional hard disk drive (HDD), or similar non-volatile storage media. The disclosure does not limit the quantity and type of the storage device 123.

It should be noted that, in the following embodiments, the description of the processor 112 may be equivalent to the description of the electronic device 11, and the description of the processor 122 may be equivalent to the description of the external device 12.

In an embodiment, the processor 122 may establish the connection 101 between the external device 12 and the electronic device 11. For example, the processor 122 may perform a handshake operation with the communication interface 111 of the electronic device 11 via the communication interface 121 to establish the connection 101. For example, in this handshake operation, the communication interface 121 may exchange information (such as power information or other useful information) with the communication interface 111 of the electronic device 11. Thereafter, the communication interface 121 may establish the connection 101 with the communication interface 111 based on this information.

In an embodiment, an agent program (also referred to as a restoration program) 124 is stored in the storage circuit 123. The processor 122 may operate the agent program 124 to trigger, initiate, or perform an operating system restoration operation on the electronic device 11. It should be noted that, in the following embodiments, the description of the agent program 124 may be equivalent to the description of the processor 122.

In an embodiment, the agent program 124 may obtain verification information (also referred to as first verification information) from the electronic device 11 based on the connection 101. For example, the first verification information may include serial number information of at least one hardware module in the electronic device 11. For example, the hardware module may include at least one of the communication interface 111, the processor 112, and the storage circuit 113.

In an embodiment, the first verification information may include serial number information of at least one of the communication interface 111, the processor 112, and the storage circuit 113. For example, the serial number information of the communication interface 111 may reflect the serial number of the communication interface 111. For example, the serial number information of the processor 112 may reflect the serial number of the processor 112. For example, the serial number information of the storage circuit 113 may reflect the serial number of the storage circuit 113. In an embodiment, the first verification information may include serial number information of other types of hardware modules in the electronic device 11.

It should be noted that the serial number information of each hardware module may be configured to uniquely identify the corresponding hardware module. Different hardware modules may have different serial number information.

In an embodiment, after obtaining the first verification information, the agent program 124 may upload the first verification information to the server 13. For example, the first verification information may be uploaded to the server 13 via one of the connections 102 and 103.

In an embodiment, after uploading the first verification information to the server 13, the server 13 may compare the first verification information with the verification information in a device database 131 in the server 13. If the first verification information matches (for example, is identical to or meets certain verification conditions) with a certain verification information (also referred to as second verification information) in the device database 131, the server 13 may determine that the first verification information passes verification. However, if the first verification information does not match with any verification information in the device database 131, the server 13 may determine that the first verification information fails verification.

In an embodiment, assuming the first verification information includes the serial number information of the processor 112. If the serial number information of the processor 112 in the first verification information matches (for example, is identical to) with a certain verification information (i.e., the second verification information) in the device database 131, the server 13 may determine that the first verification information passes verification. Conversely, if the serial number information of the processor 112 in the first verification information does not match (for example, all different) with any verification information in the device database 131, the server 13 may determine that the first verification information fails verification. By analogy, the server 13 may also determine whether other information carried by the first verification information matches with any verification information in the device database 131. Furthermore, the server 13 may determine whether the first verification information matches with any verification information in the device database 131 through any preset algorithm, which is not limited by the disclosure.

In an embodiment, after the first verification information passes verification of the server 13, the agent program 124 may download a restoration file (also referred to as an operating system restoration file) from the server 13 to the electronic device 11. For example, the operating system restoration file may be downloaded to the electronic device 11 via the connection 102. The downloaded operating system restoration file may be temporarily saved in the storage circuit 113 of the electronic device 11.

In an embodiment, in response to the first verification information passing the verification of the server 13, the agent program 124 may obtain a download link from the server 13. Thereafter, the agent program 124 may indicate the processor 112 to download the operating system restoration file from the server 13 based on this download link.

In an embodiment, after the operating system restoration file is downloaded, the agent program 124 may perform a restoration operation (also referred to as an operating system restoration operation) on the electronic device 11 based on this operating system restoration file. For example, the agent program 124 may indicate the processor 112 to load the operating system restoration file temporarily saved in the storage circuit 113. Thereafter, the processor 112 may establish a new operating system based on the operating system restoration file to replace the operating system 114. Alternatively, the processor 112 may also update the operating system 114 based on the operating system restoration file.

In an embodiment, after the operating system restoration operation is completed, the agent program 124 may automatically remove (i.e., delete) the operating system restoration file from the electronic device 11. For example, the agent program 124 may detect whether the operating system restoration operation performed based on the operating system restoration file is completed. If the operating system restoration operation is not completed, the agent program 124 may temporarily not remove the operating system restoration file (i.e., keep the operating system restoration file in the storage circuit 113). However, if the operating system restoration operation is completed, the agent program 124 may indicate the processor 112 to remove the operating system restoration file from the storage circuit 113.

In an embodiment, after the operating system restoration operation is completed, the agent program 124 may synchronously remove (i.e., delete) the operating system restoration file and the download link from the electronic device 11. For example, in response to the operating system restoration operation being completed, the agent program 124 may indicate the processor 112 to synchronously remove the operating system restoration file and the download link from the storage circuit 113.

In an embodiment, by automatically removing the operating system restoration file (and the download link) after the operating system restoration operation is completed, it may ensure that the electronic device 11 cannot perform the operating system restoration operation based on the operating system restoration file by itself in the future without being verified by the server 13. Thereby, the manufacturer may ensure the security (also referred to as controllability) of the electronic device 11 performing the operating system restoration.

In an embodiment, if the first verification information fails to pass the verification of the server 13, the agent program 124 may obtain a failure message (also referred to as a verification failure message) from the server 13. Then, the agent program 124 may present a failure message (also referred to as a restoration failure message) via the electronic device 11 based on this verification failure message. For example, according to this verification failure message, the agent program 124 may indicate the processor 112 to present this restoration failure message through various signal output devices of the electronic device 11 such as a display or a speaker. For example, this restoration failure message may include "Operating System Restoration Failed" or other similar messages that can reflect the failure of the operating system restoration.

In an embodiment, if the first verification information fails to pass the verification of the server 13, the agent program 124 may immediately terminate the operating system restoration operation on the electronic device 11. In an embodiment, terminating the operating system restoration operation is equivalent to not (continuing to) perform the operating system restoration operation.

In an embodiment, the storage circuit 113 of the electronic device 11 may store a management program 115. The management program 115 may be configured to upload the verification information (i.e., the second verification information) of the electronic device 11 to the server 13 for the server 13 to subsequently verify the first verification information. For example, similar to the first verification information, the second verification information may include serial number information of at least one hardware module in the electronic device 11. In an embodiment, the second verification information may be identical to the first verification information.

In an embodiment, before the electronic device 11 attempts to perform the operating system restoration operation, the processor 112 of the electronic device 11 may run the management program 115 to upload the verification information (i.e., the second verification information) of the electronic device 11 to the server 13. After obtaining the second verification information, the server 13 may save the second verification information to the device database 131. Subsequently, the server 13 may verify the first verification information based on the second verification information.

In an embodiment, the management program 115 may be configured to trigger, initiate, or perform a registration operation on the electronic device 11. In this registration operation, the management program 115 may upload the verification information (i.e., the second verification information) of the electronic device 11 to the server 13. In other words, uploading the verification information (i.e., the second verification information) of the electronic device 11 to the server 13 may be equivalent to registering the electronic device 11 with the server 13. Subsequently, the server 13 may confirm the registered electronic device 11 as having passed the verification, and the verified electronic device 11 may download the operating system restoration file for performing the operating system restoration operation from the server 13.

In an embodiment, after the first verification information passes the verification of the server 13, the server 13 may also select an operating system restoration file that matches the electronic device 11 from multiple operating system restoration files (also referred to as candidate operating system restoration files) according to the first verification information. Then, the server 13 may provide the selected operating system restoration file that matches the electronic device 11 to the electronic device 11 for the electronic device 11 to perform the operating system restoration operation based on this operating system restoration file. Thereby, the stability of the electronic device 11 performing the operating system restoration operation can be ensured.

Figure 2:
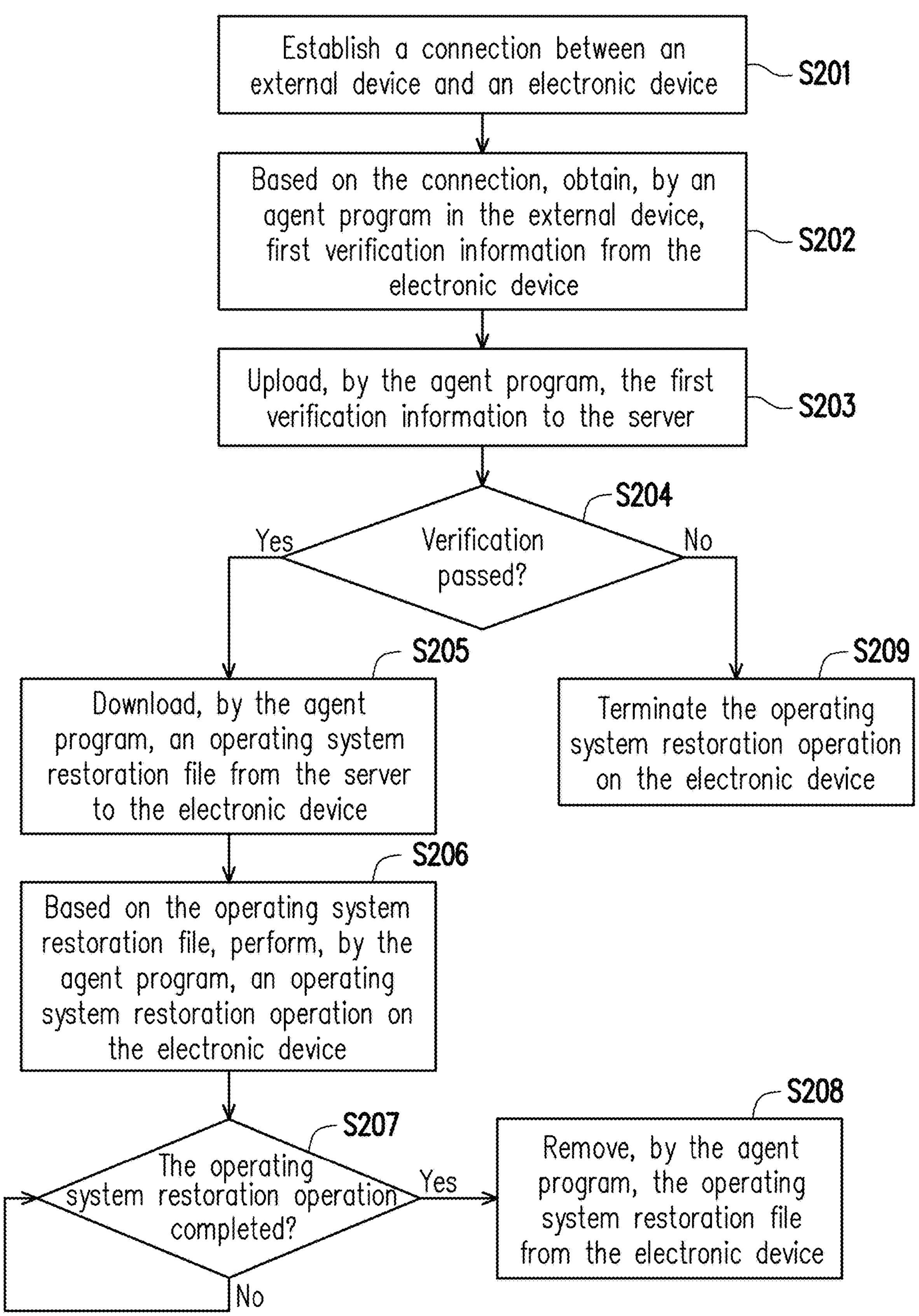
FIG. 2 is a flowchart of an operating system restoration method according to an embodiment of the disclosure.

FIG. 2 is a flowchart of an operating system restoration method according to an embodiment of the disclosure. Referring to FIG. 2, in step S201, a connection between an external device and an electronic device is established. In step S202, based on the connection, an agent program in the external device obtains first verification information from the electronic device. In step S203, the agent program uploads the first verification information to the server. In step S204, it is determined whether the first verification information passes the verification of the server.

If the first verification information passes the verification of the server, in step S205, the agent program downloads an operating system restoration file from the server to the electronic device. In step S206, based on the operating system restoration file, the agent program performs an operating system restoration operation on the electronic device. In step S207, it is determined whether the operating system restoration operation is completed. If the operating system restoration operation is completed, in step S208, the agent program removes the operating system restoration file from the electronic device. In addition, step S207 may be repeatedly performed until the operating system restoration operation is completed.

On the other hand, if the first verification information fails to pass the verification of the server, then in step S209, the operating system restoration operation on the electronic device is terminated. In an embodiment, step S209 may also include presenting a restoration failure message via the electronic device 11.

Figure 3:
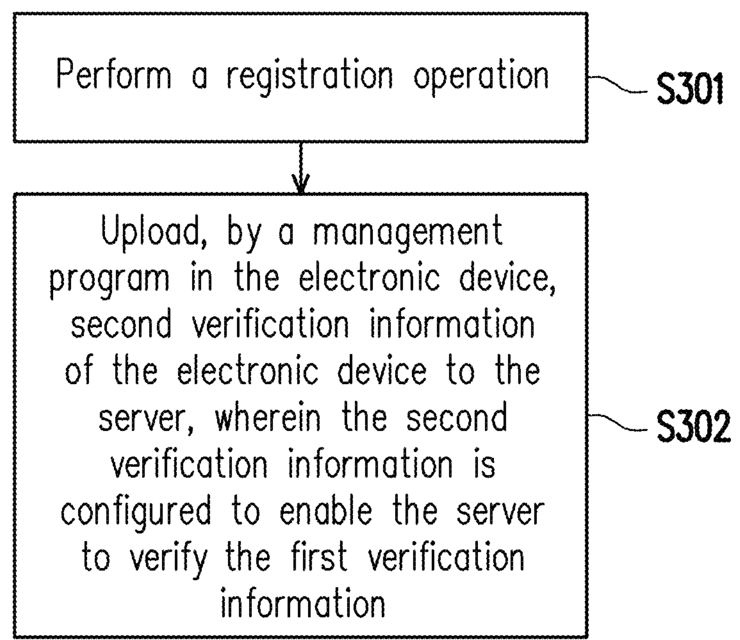
FIG. 3 is a flowchart of an operating system restoration method according to an embodiment of the disclosure.

FIG. 3 is a flowchart of an operating system restoration method according to an embodiment of the disclosure. Referring to FIG. 3, in step S301, a registration operation is performed. In step S302, a management program in the electronic device uploads second verification information of the electronic device to the server. The second verification information is configured to enable the server to verify the first verification information.

However, the steps in FIG. 2 and FIG. 3 have been described in detail above and will not be repeated here. It is worth noting that the steps in FIG. 2 and FIG. 3 can be implemented as multiple codes or circuits, and the disclosure is not limited thereto. In addition, the methods in FIG. 2 and FIG. 3 can be used in conjunction with the above examples and embodiments, or can be used alone, and the disclosure is not limited thereto.

In summary, the operating system restoration method and system using the same of the disclosure not only avoid restoration failures caused by performing operating system restoration on electronic devices based on incorrect operating system restoration files as in traditional methods, but also effectively ensure the reliability and security of the electronic device after performing operating system restoration.

Although the disclosure has been described with reference to the embodiments as above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. An operating system restoration method, comprising:

establishing a connection between an external device and an electronic device;

based on the connection, obtaining, by an agent program in the external device, first verification information from the electronic device;

uploading, by the agent program, the first verification information to a server;

after the first verification information passes verification of the server, downloading, by the agent program, an operating system restoration file from the server to the electronic device;

based on the operating system restoration file, performing, by the agent program, an operating system restoration operation on the electronic device; and after the operating system restoration operation is completed, removing, by the agent program, the operating system restoration file from the electronic device.

2. The operating system restoration method according to claim 1, wherein the connection comprises one of a wired connection and a wireless connection.

3. The operating system restoration method according to claim 1, wherein the external device comprises one of a portable computer device and a portable storage device.

4. The operating system restoration method according to claim 1, wherein the first verification information comprises serial number information of at least one hardware module in the electronic device.

5. The operating system restoration method according to claim 1, wherein the step of downloading by the agent program the operating system restoration file from the server to the electronic device after the first verification information passes the verification of the server comprises:

in response to the first verification information passing the verification of the server, obtaining, by the agent program, a download link from the server; and based on the download link, downloading the operating system restoration file from the server.

6. The operating system restoration method according to claim 5, wherein the step of removing by the agent program the operating system restoration file from the electronic device after the operating system restoration operation is completed comprises:

synchronously removing the operating system restoration file and the download link from the electronic device.

7. The operating system restoration method according to claim 1, further comprising:

if the first verification information fails to pass the verification of the server, obtaining, by the agent program, a verification failure message from the server; and based on the verification failure message, presenting a restoration failure message via the electronic device.

8. The operating system restoration method according to claim 1, further comprising:

uploading, by a management program in the electronic device, second verification information of the electronic device to the server, wherein the second verification information is configured to enable the server to verify the first verification information.

9. An operating system restoration system, comprising:

an electronic device; and an external device, wherein the external device is configured to:

establish a connection between the external device and the electronic device;

based on the connection, obtain, by an agent program in the external device, first verification information from the electronic device;

upload, by the agent program, the first verification information to a server;

after the first verification information passes verification of the server, download, by the agent program, an operating system restoration file from the server to the electronic device;

based on the operating system restoration file, perform, by the agent program, an operating system restoration operation on the electronic device; and after the operating system restoration operation is completed, remove, by the agent program, the operating system restoration file from the electronic device.

10. The operating system restoration system according to claim 9, wherein the connection comprises one of a wired connection and a wireless connection.

11. The operating system restoration system according to claim 9, wherein the external device comprises one of a portable computer device and a portable storage device.

12. The operating system restoration system according to claim 9, wherein the first verification information comprises serial number information of at least one hardware module in the electronic device.

13. The operating system restoration system according to claim 9, wherein the operation of downloading by the agent program the operating system restoration file from the server to the electronic device after the first verification information passes the verification of the server comprises:

in response to the first verification information passing the verification of the server, obtaining, by the agent program, a download link from the server; and based on the download link, downloading the operating system restoration file from the server.

14. The operating system restoration system according to claim 13, wherein the operation of removing by the agent program the operating system restoration file from the electronic device after the operating system restoration operation is completed comprises:

synchronously removing the operating system restoration file and the download link from the electronic device.

15. The operating system restoration system according to claim 9, wherein the external device is further configured to:

if the first verification information fails to pass the verification of the server, obtain, by the agent program, a verification failure message from the server; and based on the verification failure message, present a restoration failure message via the electronic device.

16. The operating system restoration system according to claim 9, wherein the electronic device is configured to:

upload, by a management program in the electronic device, second verification information of the electronic device to the server, wherein the second verification information is configured to enable the server to verify the first verification information.

* * * * *